United States Patent

[11] 3,589,637

| [72] | Inventor | Karl Wagner |
| | | Ottobrunn, Germany |
| [21] | Appl. No. | 870,021 |
| [22] | Filed | Oct. 28, 1969 |
| [45] | Patented | June 29, 1971 |
| [73] | Assignee | Agfa-Gevaert Aktiengesellschaft |
| | | Leverkusen, Germany |
| [32] | Priority | Oct. 31, 1968 |
| [33] | | Germany |
| [31] | | G 68 04 957 |

[54] TAKEUP REEL FOR PHOTOGRAPHIC APPARATUS
10 Claims, 1 Drawing Fig.

[52] U.S. Cl. .................................................... 242/71.1, 242/74
[51] Int. Cl. ........................................................ B65h 75/28
[50] Field of Search .......................................... 242/79, 74.1, 74.2, 71, 71.1, 71.2, 195, 197; 352/157, 158

[56] References Cited
UNITED STATES PATENTS

| 3,384,319 | 5/1968 | Saito, et al. | 242/71.1 |
| 3,450,366 | 6/1969 | Goldberg | 292/74 |

*Primary Examiner*—George F. Mautz
*Assistant Examiner*—Milton Gerstein
*Attorney*—Michael S. Striker ABSTRACT: A takeup reel which is used in cameras having means for automatically threading the leading end of the film comprises an annulus of teeth which engage and hold the leading end of roll film while the reel rotates about its axis to convolute the film around its core, and a washer which is rotatable with radial clearance on a hub of the shaft for the reel and is biased to an eccentric position in which it holds the film away from engagement with the majority of teeth to thus insure more satisfactory winding of exposed film on the core.

PATENTED JUN 29 1971
3,589,637
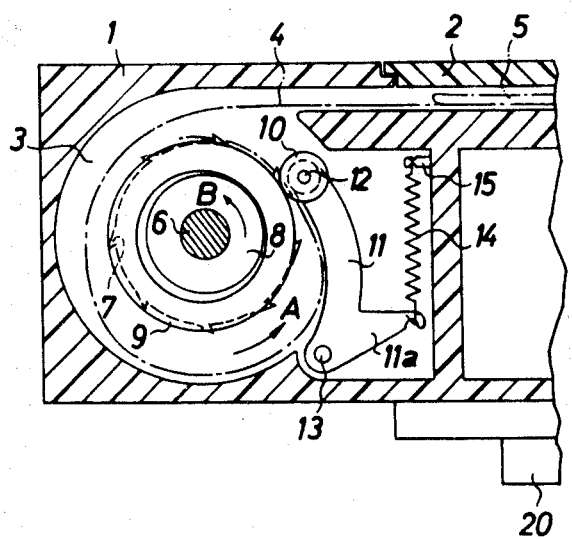
INVENTOR.
KARL WAGNER
BY Michael I Heusler
Attorney

TAKEUP REEL FOR PHOTOGRAPHIC APPARATUS

BACKGROUND OF THE INVENTION

The present invention relates to photographic apparatus in general, and more particularly to improvements in reels, spools or analogous rotary members which are employed to collect film in a still camera or motion picture camera. Still more particularly, the invention relates to improvements in takeup spools or reels for use in cameras which are provided with automatic film-threading means, i.e., with means which insure that the leading end of the film is automatically advanced into engagement with retaining means provided on the takeup reel when the film is transported lengthwise so that the leading end of the film need not be manually attached to the takeup reel.

SUMMARY OF THE INVENTION

An object of the invention is to provide a film collecting member, particularly a takeup reel or spool for use in still cameras, which is constructed and mounted in such a way that it can collect roll film in the form of closely adjacent convolutions of a least substantially cylindrical outline.

Another object of the invention is to provide a film collecting member which is compact, simple, inexpensive and capable of reliably engaging and holding the leading end of roll film.

A further object of the invention is to provide a film-collecting member which can be used in presently known photographic apparatus without necessitating any, or by necessitating only minor, alterations in the design of such apparatus.

Still another object of the invention is to provide a film-collecting member which can be used to collect and hold several types of roll film.

An additional object of the invention is to provide a novel photographic apparatus which can accept a collecting member of the above outlined character.

The invention is embodied in a photographic apparatus which includes a housing, a rotary film-collecting member mounted in the housing and comprising an annulus of film-engaging teeth which engage and hold the leading end of the film while the collecting member rotates about its axis to convolute the film, and a shielding element which is movable with respect to the axis of the collecting member to maintain the film away from engagement with some of the teeth. The shielding element is preferably a ring which preferably takes the shape of a flat washer and is movable radially of the axis of the collecting member. The outer diameter of the washer preferably equals or approximates the maximum diameter of the annulus of teeth and the collecting member (or the camera in which the collecting member is to be used) is provided with biasing means which yieldably holds the washer in an eccentric position in which the center of the washer is laterally adjacent to the axis of the collecting member so that the washer holds the majority of teeth away from engagement with the film. The washer can be mounted with a radial clearance on a hub provided on the shaft for the collecting member.

The novel features which are considered as characteristic of the invention are set forth in particular in the appended claims. The improved collecting member itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIG. is a fragmentary horizontal sectional view of a photographic apparatus and of a portion of a collecting member which embodies the invention.

DESCRIPTION OF THE PREFERRED EMBODIMENTS

The drawing illustrates a portion of a still camera having a housing 1 provided with a removable or pivotable rear wall or cover 2 and defining a chamber 3 for a novel takeup reel. The roll film is shown at 4; this film is engaged by a pressure plate 5 (indicated by phantom lines) which is mounted on the cover 2 and biases the film against a window which is formed with an exposure aperture located behind the objective lens mount 20.

The chamber 3 accommodates a shaft 6 which can be driven by the film-transporting mechanism to rotate in the direction indicated by arrow B. The takeup reel comprises a customary core and one or two flanges (not shown) and is preferably removably mounted on the shaft 6. The takeup reel further includes an annulus of teeth 7 whose tips extend forwardly in the direction of rotation of the reel (arrow A). The purpose of the teeth 7 is to engage the leading end of the film 4 and to hold such leading end against slippage while the takeup reel rotates to convolute the exposed frames of the film 4 on its core. In accordance with a feature of the invention, the takeup reel or the camera is provided with a ring-shaped shielding or blocking element 9 which is movable radially of the shaft 6, i.e., at right angles to the axis of rotation of the reel and serves to hold several (preferably the majority of) teeth 7 away from engagement with the film 4. In the illustrated embodiment, the shielding element 9 is a flat washer which is immediately or closely adjacent to the teeth 7 and is mounted with radial clearance on a hub 8 of the shaft 6. A biasing device including an idler roller 10 is mounted in the housing 1 or on the takeup reel to maintain the ring 9 in a position in which the center of the ring is laterally adjacent to the axis of the shaft 6. The biasing device further includes a two-armed lever 11 one arm of which carries the roller 10 and the other arm (11a) of which is engaged by one end of a helical spring 14 which tends to turn the lever 11 in a counterclockwise direction. The other end of the spring 14 is attached to a post 15 in the housing 1. The lever 11 is turnable on a pivot pin 13 which is mounted in the housing. The roller 10 is freely rotatable on a pin 12 carried by the longer arm of the lever 11.

When the takeup reel is properly mounted in the chamber 3 and the user of the camera actuates the film-transporting mechanism (not shown) to advance the film 4 lengthwise, the leading end of the film travels in front of the pressure plate 5 and enters the chamber 3. The leading end is relatively stiff so that it engages the surface surrounding the chamber 3 and travels in an arc in the direction indicated by arrow A until it reaches the nip between the roller 10 and the adjacent tooth or teeth 7. The reel rotates with the shaft 6 and the tooth or teeth 7 engage the leading end to hold it against slippage with reference to the reel during continuing rotation in the direction indicated by arrow A. The roller 10 maintains the ring 9 in the aforementioned eccentric position so that the ring holds several teeth 7 away from engagement with the film 4, i.e., the teeth 7 engage the film only in the region of the roller 10 whereby the rotating reel is capable of convoluting the film in a series of closely adjacent convolutions of cylindrical outline. As the reel continues to rotate in the direction indicated by arrow A, any gaps between the superimposed convolutions on the core of the reel are eliminated because the rotational speed of the shaft 6 is such that the takeup reel exerts a certain pull on the film. Thus, any loops or like undesirable formations in the convoluted part of the film are eliminated in a fully automatic way.

In presently known cameras with automatic threading of the leading end of roll film, the entire annulus of teeth on the takeup reel is free to engage at least the innermost convolution of the film. Since the spacing between the teeth is not always properly related to the spacing between the perforations of the film, the innermost convolution or convolutions are likely to form "bubbles" or analogous looplike formations which prevent development of cylindrical convolutions so that the convoluted film occupies excessive amounts of space in the chamber and is likely to rub against the housing. Such rubbing can cause jamming of the film. It was found that the improved takeup reel is capable of collecting the film in the form of truly cylindrical or at least nearly cylindrical convolutions so that the full length of roll film can be collected in the chamber 3 without any rubbing against the housing and without the formation of loops in the innermost convolution or convolutions of the film.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What I claim as new and desire to be protected by Letters Patent is set forth in the appended claims.

1. In a photographic apparatus, a combination comprising a housing; a film-collecting member rotatably mounted in said housing and including an annulus of film-engaging teeth which engage and hold the leading end of the film while the collecting member rotates about its axis to convolute the film; and a shielding element movable with respect to said axis to maintain the film away from engagement with some of said teeth.

2. A combination as defined in claim 1, wherein said shielding element is a ring which is movable substantially at right angles to said axis and is adjacent to said teeth.

3. A combination as defined in claim 2, wherein said ring constitutes a flat washer.

4. A combination as defined in claim 2, wherein the outer diameter of said ring at least approximates the maximum diameter of said annulus.

5. A combination as defined in claim 4, further comprising biasing means for maintaining said shielding element in a position in which its center is laterally adjacent to said axis.

6. A combination as defined in claim 5, wherein said biasing means includes a spring-biased roller.

7. A combination as defined in claim 5, wherein said biasing means is installed in said housing.

8. A combination as defined in claim 1, wherein said shielding element is arranged to maintain the film away from engagement with the majority of said teeth.

9. A combination as defined in claim 1, further comprising a rotary hub mounted in said housing, said shielding element constituting a ring which surrounds said hub with radial clearance.

10. A combination as defined in claim 1, wherein said teeth have tips extending forwardly in the direction of rotation of said collecting member.